(12) United States Patent
Lee

(10) Patent No.: US 6,601,810 B2
(45) Date of Patent: Aug. 5, 2003

(54) APPARATUS FOR POSITIONING SCREEN OF MONITOR

(75) Inventor: Gang Hoon Lee, Kyungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/925,683

(22) Filed: Aug. 10, 2001

(65) Prior Publication Data

US 2002/0020792 A1 Feb. 21, 2002

(30) Foreign Application Priority Data

Aug. 10, 2000 (KR) .......................... 2000-46296

(51) Int. Cl.[7] ................................. E04G 3/00
(52) U.S. Cl. .................. 248/278.1; 248/923; 248/279.1
(58) Field of Search .................... 248/278.1, 183.1, 248/274.1, 279.1, 917, 922, 918, 923; 16/337; 361/681

(56) References Cited

U.S. PATENT DOCUMENTS

| | | | | |
|---|---|---|---|---|
| 5,022,778 A | * | 6/1991 | Lu | |
| 6,018,847 A | * | 2/2000 | Lu | 16/337 |
| 6,164,611 A | * | 12/2000 | Kuhnke | 248/279.1 |
| 6,244,553 B1 | * | 6/2001 | Wang | 248/278.1 |
| 6,285,339 B1 | * | 9/2001 | McGill | 248/278.1 |
| 6,366,452 B1 | * | 4/2002 | Wang et al. | 361/681 |

* cited by examiner

Primary Examiner—Alvin Chin-Shue
(74) Attorney, Agent, or Firm—Jacobson Holman PLLC

(57) ABSTRACT

Disclosed is an apparatus for positioning the screen of a monitor that can not only function as a monitor supporter but also position the screen in vertical and horizontal directions to conform to the viewing angle of the screen. The apparatus for positioning screen of a monitor according to the invention comprises a swiveling unit including a lower bracket provided on an upper end portion of a monitor supporting column for adjusting a turning angle of the screen, and a swiveling shaft axially coupled with the lower bracket for turning around, and a tilting unit including a pair of tilting angle adjusting plates fixed on an upper end portion of the swiveling shaft for tilting the screen, a tilting shaft inserted between the tilting angle adjusting plates for moving the screen in a vertical direction, and upper brackets locked with a rear surface of the monitor for housing both ends of the tilting shaft and movable in a vertical direction centering around the tilting shaft.

11 Claims, 5 Drawing Sheets

APPARATUS FOR POSITIONING SCREEN OF MONITOR

BACKGROUND OF THE INVENTION

1. Field of the Invention

The present invention relates to an apparatus for positioning a screen of a monitor, and in particular, to an apparatus for positioning a screen of a monitor that can not only function as a support for the monitor, but also adjust the screen of the monitor upward, downward, to the left and right directions to conform to viewing angle. The present invention particularly relates to an apparatus for positioning the screen of a light-weight monitor, e.g., of an LCD monitor.

2. Description of the Related Art

FIG. 1 is a perspective view of a conventional apparatus for positioning a screen of a monitor.

Referring to FIG. 1, the conventional apparatus for positioning the screen of the monitor comprises a lower part supporting plate 11 for supporting a plurality of constitutional elements; a rotating body fixing plate 12 fixed onto the lower part supporting plate 11 and having a shape that allows rotation of a monitor; a swiveling shaft 13 installed to be rotatable in horizontal directions at a central aperture of the rotating body fixing plate 12; a supporting column 14 fixed onto the swiveling shaft 13; a pair of first brackets fixed on an upper end of the supporting column 14; a tilting shaft 16 rotatably inserted to the first bracket 15; a second bracket 17 fixed on the tilting shaft 16 for rotating around the first bracket 15; and a monitor fixing plate 18 fixed on the second bracket 17 and a rear surface of the monitor.

FIG. 2 is a cross-sectional view of A–A' in FIG. 1. Referring to FIGS. 1 and 2, the swiveling shaft 13 is inserted to the rotating body fixing plate 12. An end portion of the swiveling shaft 13 houses a nut 21. A sliding washer 23 is inserted between the rotating body fixing plate 12 and the nut 21, so that the swiveling shaft 13 can rotate in horizontal directions around the rotating body fixing plate 12.

An angle adjusting plate 22 having a rotating stopper groove 22a on an external periphery thereof is provided on an upper side of the rotating body fixing plate 12, to which an end portion of the swiveling shaft 13 is inserted so as to limit rotation of the swiveling shaft 13.

According to the conventional apparatus for positioning screen of a monitor constructed as shown in FIGS. 1 and 2, the first bracket and the second bracket coupled with the supporting column 14 and the monitor fixing plate 18 rotate in vertical direction by means of the tilting shaft 16. As a consequence, the screen tilts upward and downward. On the other hand, the monitor fixing plate 18 cannot tilt more than a predetermined angle due to a stopper 17a provided on the second bracket 17.

The swiveling shaft 13 is rotatably fixed onto the rotating body fixing plate 12 by means of the nut 21. The washer 23 is inserted between a head of the nut 21 and the rotating body fixing plate 12. The angle adjusting plate 22 is inserted between the rotating body fixing plate 12 and the swiveling shaft 13. The stopper groove 22a is formed on a peripheral surface of the angle adjusting plate 22. Both ends of the stopper groove 22a are adjacent to the rotating stopper 12a formed on the rotating body fixing plate 12, so that the swiveling shaft 13 cannot rotate any further.

According to the conventional apparatus for positioning screen of a monitor described above, however, a user needs to position the screen by gripping the screen unit of the monitor. In that case, the tilting can be freely moved due to a short distance between the monitor and the tilting shaft 16, while the monitor is not easily rotated in horizontal directions due to the far distance between the monitor and the swiveling shaft 13.

To be specific, by reference to FIG. 3, the monitor comprises a screen unit 33 for displaying image, a supporting column 32 for supporting the screen unit, and a supporting plate 31 for supporting the supporting column 32.

To describe the operation based on the above construction, the monitor can be easily positioned in a vertical direction because of the horizontal distance H between the rotating axis (the drawing reference numeral 16 in FIG. 1) and the screen unit 33. Meanwhile, since the vertical distance V between the swiveling shaft 13 and the screen unit 33 is as long as the supporting column 32, strong friction occurs on the sliding washer 23 and the screen unit is not easily rotated even if a great force is laid on the screen to rotate the screen when the axis is not exactly perpendicular.

SUMMARY OF THE INVENTION

It is, therefore, an object of the present invention to provide an apparatus for positioning the screen of a monitor that is capable of positioning a monitor in horizontal directions with a slight force.

It is another object of the present invention to provide an apparatus for positioning the screen of a monitor having a compact structure that can be easily assembled.

To achieve the above objects, there is provided an apparatus for positioning the screen of a monitor by a user, comprising: a lower bracket provided on an upper end of a monitor supporting column for adjusting a turning angle of a screen; a swiveling unit axially locked with the lower bracket in vertical direction and having a swiveling shaft for rotatable movement; a pair of tilting angle adjusting plates fixed onto an upper end of the swiveling shaft for tilting the screen; a tilting shaft inserted between the tilting angle adjusting plates for moving the screen in a vertical direction; and a tilting unit locked with a rear surface of the monitor for housing both ends of the tilting shaft and including a pair of upper brackets movable in a vertical direction centering around the tilting shaft.

A pair of coil springs are inserted to left and right sides of the tilting shaft, which provide a restoring force so as to rotate the upper bracket upward under a support of the upper brackets and the tilting angle adjusting plates.

First holder grooves are formed on the upper brackets for supporting end portions of the coil springs, and second holder grooves are formed on the tilting angle adjusting plates for supporting internal end portions of the coil springs.

An angle adjusting plate having a turning angle limiting stopper groove on a peripheral surface thereof is provided on an upper portion of the lower bracket to determine limitation of the rotation of the swiveling shaft by being fixed onto the swiveling shaft, and the turning angle limiting stopper is formed on a bent line of the lower bracket so that the angle adjusting plate can be guided to the turning angle limiting stopper groove.

A tilting angle limiting stopper is provided on the other side of the upper bracket, which is fixed onto the screen unit, for determining limitation of a tilting angle of the monitor, and a tilting angle limiting stopper groove is formed on upper ends of the tilting angle adjusting plates for guiding the tilting angle limiting stopper.

Screw units are formed on both end portions of the tilting shaft so as to be locked with the washer and the nut by being inserted to the upper brackets and the tilting angle adjusting plates.

An upper protrusion of an oval shape is formed on an upper end portion of the swiveling shaft so as to be inserted to the tilting angle adjusting plates, and an upper portion protrusion inserting groove is formed on one tilting angle adjusting plate so that the tilting angle adjusting plates and the swiveling shaft can rotate together.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
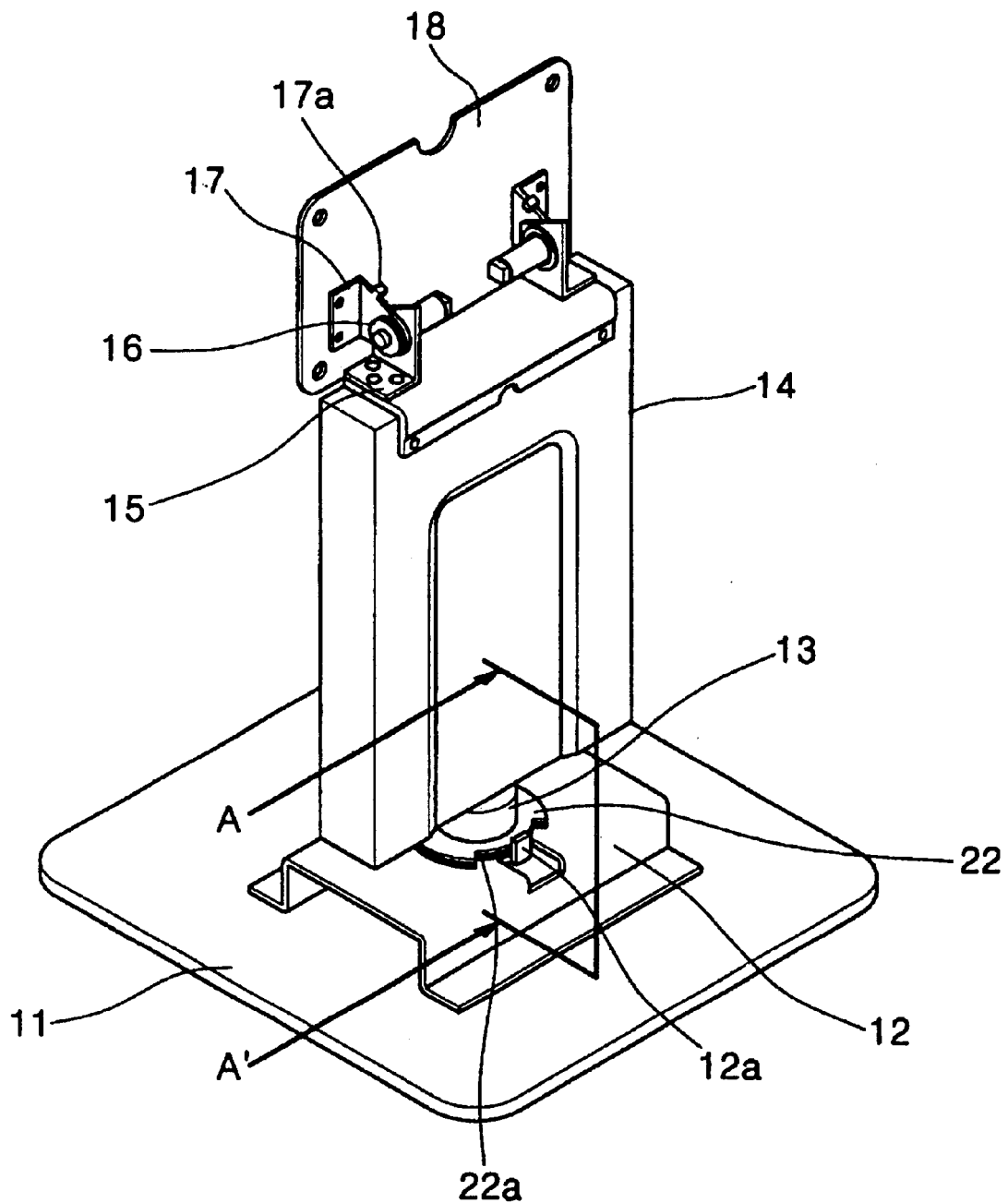
FIG. 1 is a schematic perspective view of a conventional apparatus for positioning screen of a monitor.
Figure 2:
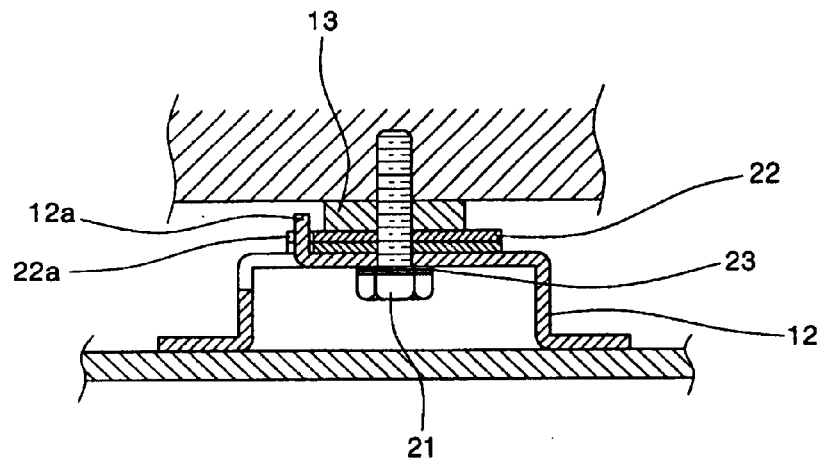
FIG. 2 is a cross-sectional view of A–A' in FIG. 1.
Figure 3:
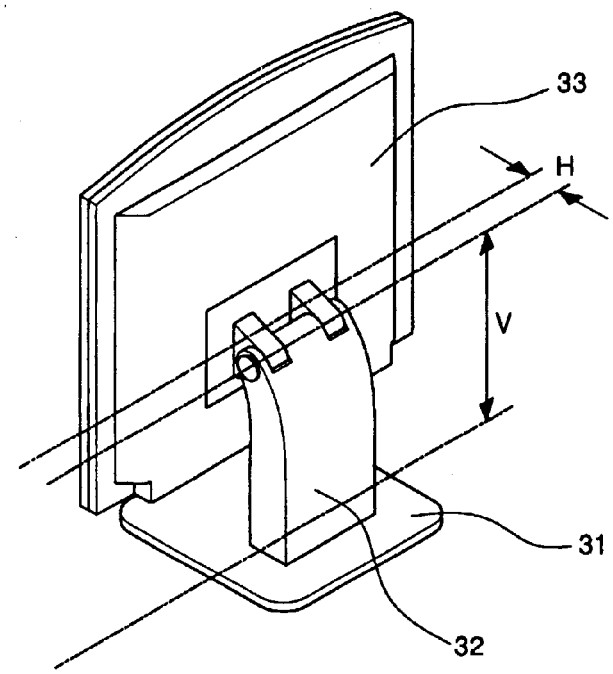
FIG. 3 is a diagram illustrating a mechanism of the conventional apparatus for positioning screen of a monitor.
Figure 4:
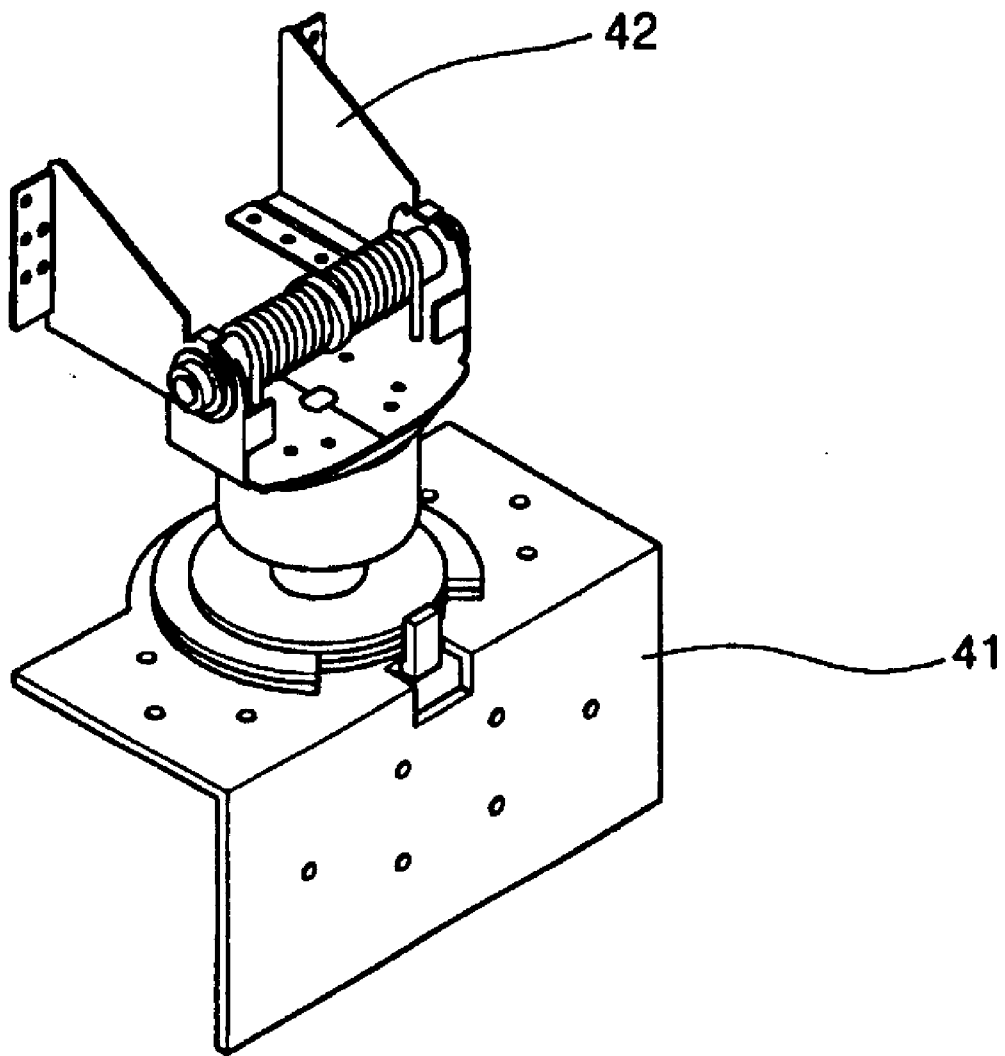
FIG. 4 is a schematic perspective view of an apparatus for positioning screen of a monitor according to the present invention.

FIG. 4 is a schematic perspective view of an apparatus for positioning screen of a monitor according to the present invention.

Referring to FIG. 4, the apparatus for positioning screen of a monitor according to the present invention comprises a lower bracket 41 locked with a supporting column of a monitor, and a pair of upper brackets 42 locked with the screen unit.

The apparatus for positioning screen of a monitor according to the present invention is characterized in that swiveling and tilting are not performed on different positions but on a single position, unlike the conventional apparatus for positioning screen of a monitor, so as to solve the conventional problems.

Figure 5:
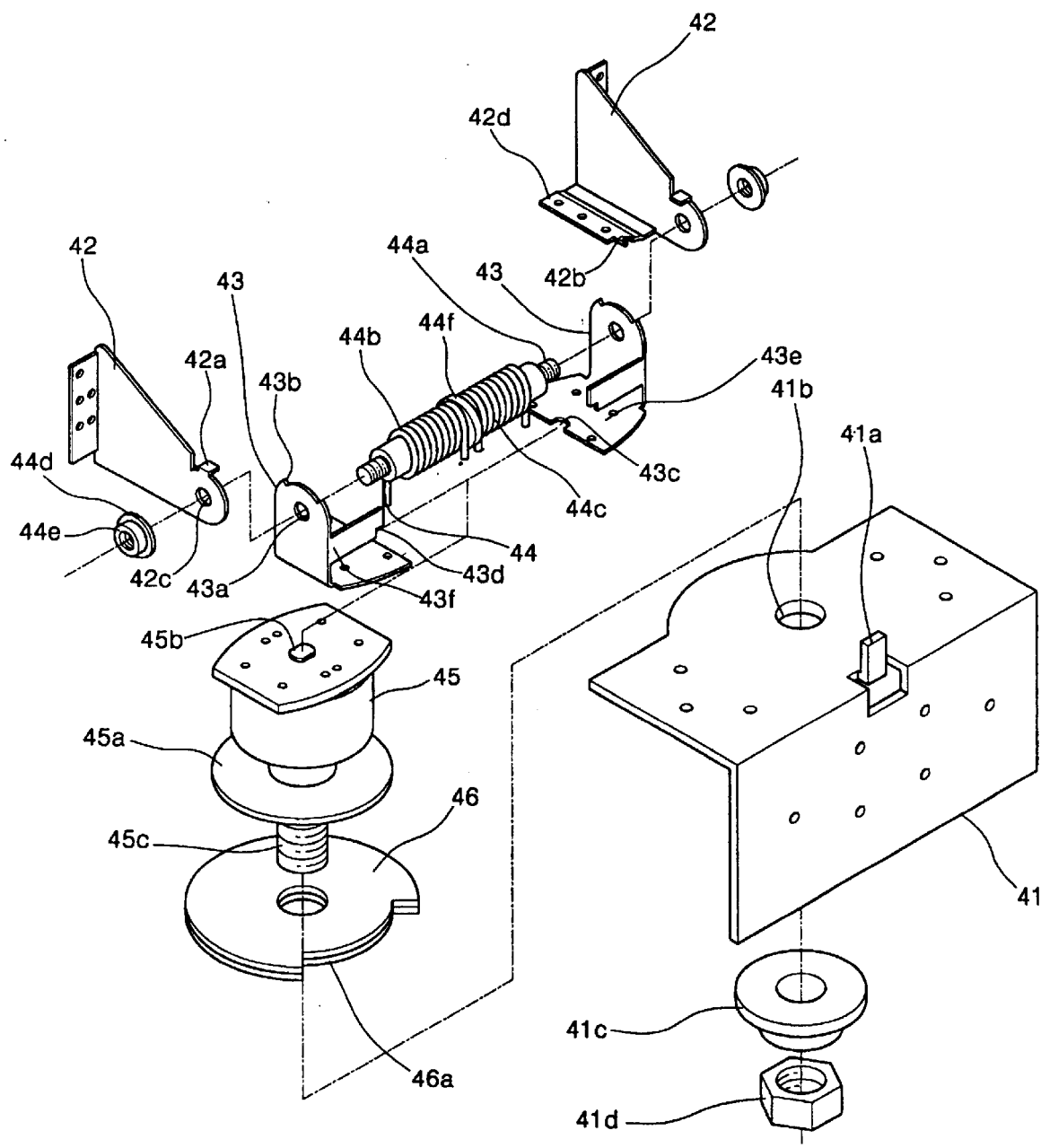
FIG. 5 is an analytic perspective view of the apparatus for positioning screen of a monitor according to the present invention.

FIG. 5 is an analytic perspective view of the apparatus for positioning the screen of a monitor according to the present invention.

Referring to FIG. 5, the construction of the present invention mainly comprises a tilting section and a swiveling section. The tilting section comprises a pair of upper brackets 42 locked with the screen unit; a pair of tilting angle adjusting plates 43 for adjusting a tilting angle of the screen unit; and a tilting shaft 44 for tilting the screen unit by being inserted to the tilting angle adjusting plates 43 and the upper brackets 42.

The swiveling section comprises a lower bracket 41 connected to the supporting column, and a swiveling shaft 45 for rotating the screen unit in horizontal directions by being inserted into the lower bracket 41.

To be specific, one upper bracket 42 of the tilting section is locked with the screen unit by means of a locking member, and the other upper bracket 42 has a tilting shaft inserting hole 42c so that the tilting shaft 44 can be inserted thereto. A tilting angle limiting stopper 42a is provided on an upper side of the tilting shaft inserting hole 42c, and an upper bracket bending unit 42d is provided in a horizontally bent shape on a lower side of the upper brackets 42. First holder grooves 42b are formed on the upper bracket bending unit 42b so that an internal one end portion of the second coil spring 44c can be laid thereon.

A horizontal tilting angle adjusting plate bending unit 43e is provided on a lower side of the tilting angle adjusting plate 43 in a horizontally bent shape. An upper protrusion inserting groove 43c is formed at the center of the horizontal tilting angle adjusting plate bending unit 43e so that the swiveling shaft 45 can be inserted thereto. A vertical tilting angle adjusting plate bending unit 43f is formed on one side of the center portion of the tilting angle adjusting plate 43. A second holder groove 43d is formed on a lower end of the vertical tilting angle adjusting plate bending unit 43f. Tilting shaft inserting holes 43a are formed on upper sides of the tilting angle adjusting plates 43, and the tilting angle limiting stopper 42a is inserted to an upper end of the tilting angle adjusting plate 43 so that the tilting angle limiting stopper groove 43b can limit rotation of the tilting angle adjusting plates 43 in vertical direction.

A tilting shaft screw unit 44a has a screw groove for inserting and fixing the tilting shaft screw to the tilting shaft inserting holes 42c, 43a of both end portions of the tilting shaft 44. A left and right spacing wall 44f is provided to space two springs inserted to the center of the tilting shaft 44. First and second coil springs 44b, 44c are inserted centering around the left and right spacing wall 44f. The tilting shaft 44 is fixed by the nut 44e after being inserted to the tilting shaft inserting holes 42c, 43a. It is preferable to provide a third washer 44d to firmly engage the nut 44e.

Meanwhile, the tilting section comprises pairs of parts except the tilting shaft 44 in a symmetrical shape.

The following is a description of the assembling process and operation of the tilting section constructed above. The first coil spring 44b and the second coil spring 44c are positioned around an external periphery of the tilting shaft 44, and the tilting shaft 44 is inserted to the tilting shaft inserting holes 2c, 43a. In that process, the spring end portions of the outside of the first coil spring and the second coil spring 44b, 44c are inserted to the first holder groove 42b, respectively, while the spring end portions of the inside thereof are inserted to the second holder groove 43d formed on the vertical tilting angle adjusting plate bending unit 43f.

Under the above construction, the first coil spring 44b and the second coil spring 44c perform a restoring force in a compressed state, and this restoring force functions to push the upper brackets 42 upward centering around the tilting shaft 44. A slight restoring force can lift the screen unit upward.

Meanwhile, if the upper brackets 42 and the tilting angle adjusting plates 43 are inserted centering around the tilting shaft 44, the tiling angle limiting stopper 42a is precisely positioned at the external periphery of the tilting angle limiting stopper groove 43b. Therefore, the tilting angle limiting stopper 42a is guided by the tilting angle limiting stopper groove 43b and not rotatable beyond the limit of a predetermined scope. As a consequence, the upper brackets 42 connected to the tilting angle limiting stopper cannot rotate beyond the limit determined by the tilting angle limiting stopper groove 43b.

Examining the construction of the swiveling section, the swiveling section comprises a lower bracket 41 connected to the supporting column, and a swiveling shaft 45 inserted to the lower bracket 41 to turn around in horizontal direction.

The lower bracket 41 is bent to be perpendicular, and the bent lower portion is locked with the supporting column, while the upper portion is coupled with the swiveling shaft 45. For this operation, an upper surface of the lower bracket 41 has a hole 41b, to which the swiveling shaft 45 is inserted. A turning angle limiting stopper 41a is provided to set a rotational limit of the swiveling shaft 45 on a bent line of the lower bracket 41.

The swiveling shaft 45 comprises an upper oval protrusion 45b protruded from an upper end portion thereof, and a screw groove 45c to be fixed by the locking member such as a nut after being inserted to an axis inserting hole 41b. Once after the screw groove 45c is inserted to the lower bracket 41, a second washer 41c and a nut 41d are inserted thereto in order so as to fix the swiveling shaft 45. The second washer 41c then performs a sliding function.

Meanwhile, a turning angle adjusting plate 46 having a turning angle limiting stopper groove 46a is formed on an upper surface of the lower bracket 41, which is adjacent to the swiveling shaft 45, to limit turning angle of the swiveling shaft 45 in horizontal direction.

The following is a detailed description of an assembling process and operation of the swiveling section. An upper protrusion 45b is inserted to an upper protrusion inserting groove 43c at a lower end portion of the tilting angle adjusting plate 43. Since the upper protrusion 45b is of an oval shape, the upper swiveling shaft 45 cannot relatively rotate with respect to the tilting angle adjusting plate 43.

Meanwhile, the turning angle adjusting plate 46 is firmly locked with the swiveling shaft 45 to operate together with the swiveling shaft 45. Here, the turning angle limiting stopper 41a is guided within the scope of the turning angle limiting stopper groove 46a. Since the turning angle limiting stopper groove 46a for guiding the swiveling has a guiding scope of a predetermined angle, rotation of the swiveling shaft 45 is limited to be within the guiding scope.

Lubricant is coated on upper and lower surfaces of the first washer 45a so that the swiveling shaft 45 can freely turn around without being affected by friction.

According to the present invention as described above, the swiveling shaft 45 is positioned on a portion adjacent to the screen unit, unlike the conventional art. Therefore, the user can position the screen with more convenience. The following is a description of such relationship made with reference to perspective view of a monitor employing the apparatus for positioning screen of the monitor.

Figure 6:
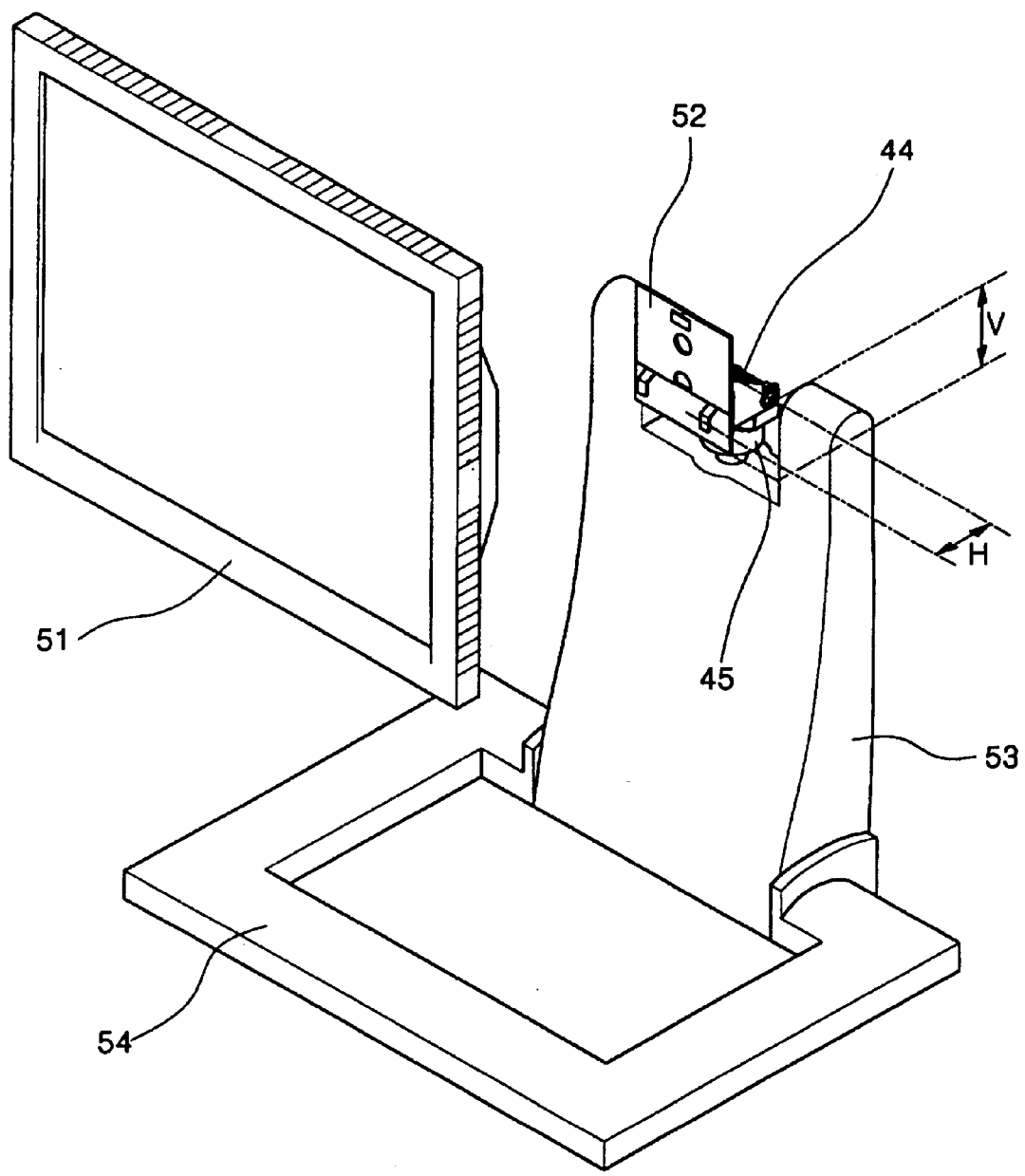
FIG. 6 is a perspective view of a monitor employing the apparatus for positioning screen of a monitor according to the present invention.

The monitor shown in FIG. 6 comprises a screen unit 51 for displaying images, a screen positioning unit 52 for selecting a position easily viewable by the user by rotating position of the screen unit 51 in vertical and horizontal directions, a supporting column 53 locked with the screen positioning unit 52 for supporting the screen unit 51, and a supporting plate 54 locked with a lower surface of the supporting column for maintaining a horizontal level.

If the user wishes to position the screen as desired while using the monitor, the user applies a force on the screen unit 51 by gripping the same. From a mechanical perspective, in order to rotate position of the screen unit 51 in a vertical direction, the screen can be easily moved due to a short horizontal distance H between the tilting shaft 44 and the screen unit 51. Also, the vertical distance V between the swiveling shaft 45 and the screen unit 51 is notably shortened, unlike the conventional art, in order to rotate the screen unit 51 in a horizontal direction. Therefore, almost no friction occurs at a part contacting the swiveling shaft 45. Therefore, the user can easily adjust the viewing angle by moving the screen unit 51 with ease and convenience.

As described above, the apparatus for positioning screen of a monitor according to the present invention has advantages of enabling the user to easily position the screen by reducing the number of parts through positioning a tilting angle and a turning angle at the same location as well as reducing the unit cost of manufacturing the product.

The present invention has another advantage of reducing the force to be applied on the screen for rotation thereof by employing the coil springs having a steady restoring force because the force equivalent to the restoring force of the coil springs is not required when lifting the screen unit upward against the weight of the screen unit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for positioning the screen of a monitor by a user, comprising:
   a swiveling unit including a lower bracket provided on an upper end portion of a monitor supporting column for adjusting a turning angle of the screen, and a swiveling shaft axially coupled with the lower bracket for turning around; and
   a tilting unit including a pair of tilting angle adjusting plates, each plate having a horizontal tilting angle adjusting plate bending unit substantially perpendicular thereto that is fixed on and substantially parallel with an upper end portion of the swiveling shaft, a pair of upper brackets pivotally connected to said tilting angle adjusting plates, respectively, by a tilting shaft inserted between the tilting angle adjusting plates for tilting the screen in a vertical direction, said upper brackets locked with a rear surface of the monitor, close proximity between said tilting shaft and said horizontal tilting angle adjusting plate bending units reducing frictional resistance to horizontal adjustment of said monitor.

2. The apparatus of claim 1, wherein a pair of coil springs are mounted on the tilting shaft, said coil springs supported at respective ends by said upper brackets and said tilting angle adjusting plates so as to provide a restorative force to rotation of the upper brackets.

3. The apparatus of claim 2, wherein a first holder groove is formed on each of the upper brackets for supporting external end portions of the coil springs, respectively, and a second holder groove is formed on each of the tilting angle adjusting plates for supporting internal end portions of the coil springs, respectively.

4. The apparatus of claim 1, wherein a tilting angle limiting stopper is provided on at least one upper bracket, which is fixed onto the monitor, upper end portions of the tilting angle adjusting plates including tilting angle limiting stopper grooves for guiding the tilting angle limiting stopper, said tilting angle limiting stopper acting with said tilting angle limiting stopper grooves to determine a tilting angle limit of said monitor.

5. The apparatus of claim 1, wherein the tilting shaft has threaded ends which pass through holes in said upper brackets and tilting angle adjusting plates and is secured thereto at each end with a washer and a nut.

6. The apparatus of claim 1, wherein an oval shaped protrusion is formed on an upper end portion of the swiveling shaft, and an upper protrusion inserting groove having a shape complementary to said oval-shaped protrusion is formed on at least one tilting angle adjusting plate, said oval shaped protrusion fitting within said upper protrusion inserting groove so that the tilting angle adjusting plates and the swiveling shaft rotate together, being connected only by the fitting of the protrusion to said groove.

7. An apparatus for positioning the screen of a monitor by a user, comprising:

a swiveling unit including a lower bracket mounted on an upper end portion of a monitor supporting column, and a swiveling shaft axially coupled with the lower bracket, an oval-shaped protrusion being formed on an upper end portion of said swiveling shaft, said swiveling unit for horizontally adjusting said monitor through rotation of said swiveling shaft; and a tilting unit including a pair of tilting angle adjusting plates, each plate provided on a lower side thereof with a horizontal tilting angle adjusting plate bending unit that is mounted directly to an upper end portion of the swiveling shaft, an upper protrusion inserting groove having a shape complementary to said oval-shaped protrusion and being formed on at least one of said horizontal tilting angle adjusting plate bending units, said oval-shaped protrusion being fittingly inserted into said upper protrusion inserting groove so that the tilting angle adjusting plates and the swiveling shaft, connected only by the fitting of the protrusion within said groove, rotate together, a pair of upper brackets pivotally connected to said tilting angle adjusting plates, respectively, by a tilting shaft inserted between the tilting angle adjusting plates for tilting the screen in a vertical direction, said upper brackets locked with a rear surface of the monitor, said direct mounting of said tilting unit to said swiveling unit such that said tilting shaft is proximal said swiveling shaft facilitating horizontal adjustment of said monitor by reducing frictional resistance.

8. The apparatus of claim 7, wherein a pair of coil springs are mounted on the tilting shaft, said coil springs supported at respective ends by said upper brackets and said tilting angle adjusting plates so as to provide a restorative force to rotation of the upper brackets.

9. The apparatus of claim 8, wherein a first holder groove is formed on each of the upper brackets for supporting external end portions of the coil springs, respectively, and a second holder groove is formed on each of the tilting angle adjusting plates for supporting internal end portions of the coil springs, respectively.

10. The apparatus of claim 7, wherein a tilting angle limiting stopper is provided on at least one upper bracket, which is fixed onto the monitor, upper end portions of the tilting angle adjusting plates including tilting angle limiting stopper grooves for guiding the tilting angle limiting stopper, said tilting angle limiting stopper acting with said tilting angle limiting stopper grooves to determine a tilting angle limit of said monitor.

11. The apparatus claim 7, wherein the tilting shaft has threaded ends which pass through holes in said upper brackets and tilting angle adjusting plates and is secured thereto at each end with a washer and a nut.

* * * * *